United States Patent [19]

Ziegler, Jr.

[11] Patent Number: 4,621,826
[45] Date of Patent: Nov. 11, 1986

[54] KNOCK-DOWN TRICYCLE
[75] Inventor: William H. Ziegler, Jr., Opelika, Ala.
[73] Assignee: Hedstrom Corporation, Bedford, Pa.
[21] Appl. No.: 766,699
[22] Filed: Aug. 19, 1985
[51] Int. Cl.⁴ .......................... B62K 9/02; B62K 15/00; B62M 1/02
[52] U.S. Cl. ................................... 280/259; 280/278; 280/282
[58] Field of Search ................. 280/282, 278, 287, 62, 280/7.15, 7.1, 259; 74/560

[56] References Cited

U.S. PATENT DOCUMENTS 2,768,834 10/1956 Wilson ................................ 280/282
3,039,791 6/1962 Horowitz ............................ 280/279
4,103,921 8/1978 Brooks ................................ 280/282
4,198,069 4/1980 O'Brian .............................. 280/278
4,350,360 9/1982 Olsson ................................ 280/278

Primary Examiner—John J. Love
Assistant Examiner—Everett G. Diederiks, Jr.
Attorney, Agent, or Firm—Cesari and McKenna

[57] ABSTRACT

A knock-down tricycle has its main structural parts made of stamped metal or molded components which are relatively inexpensive to fabricate and which, when disassembled, occupy a minimum volume allowing the tricycle to be shipped in a knocked-down condition in a minimum size package. The various components of the tricycle can be assembled easily using simple tools and, when assembled, they form a tricycle which is unusually strong and sturdy.

23 Claims, 5 Drawing Figures

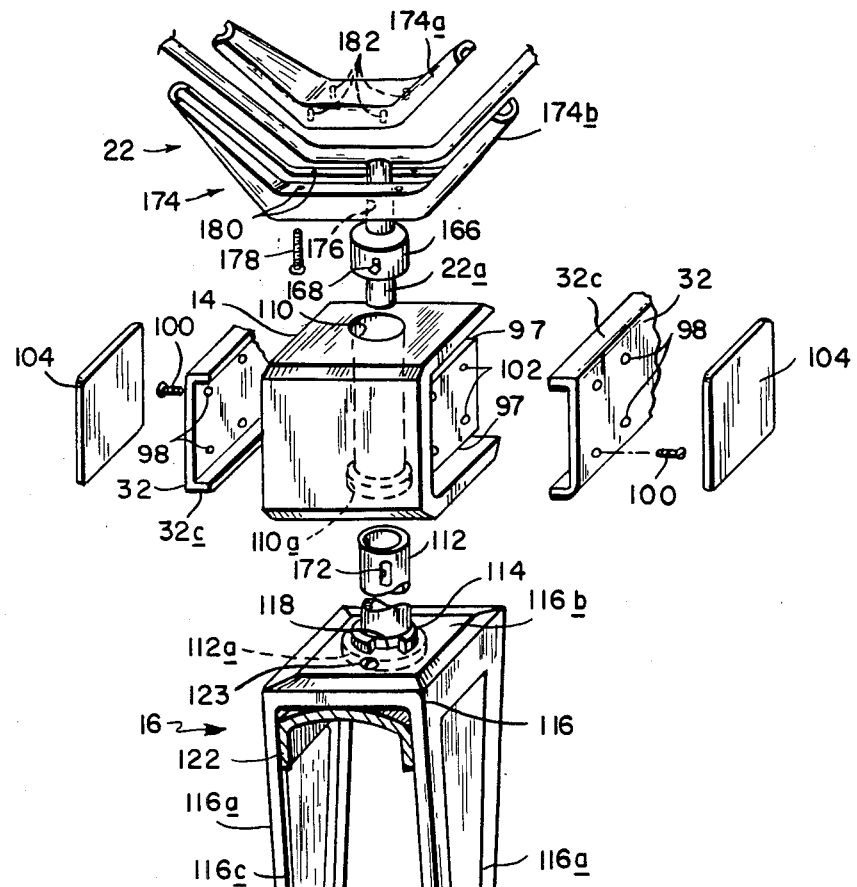
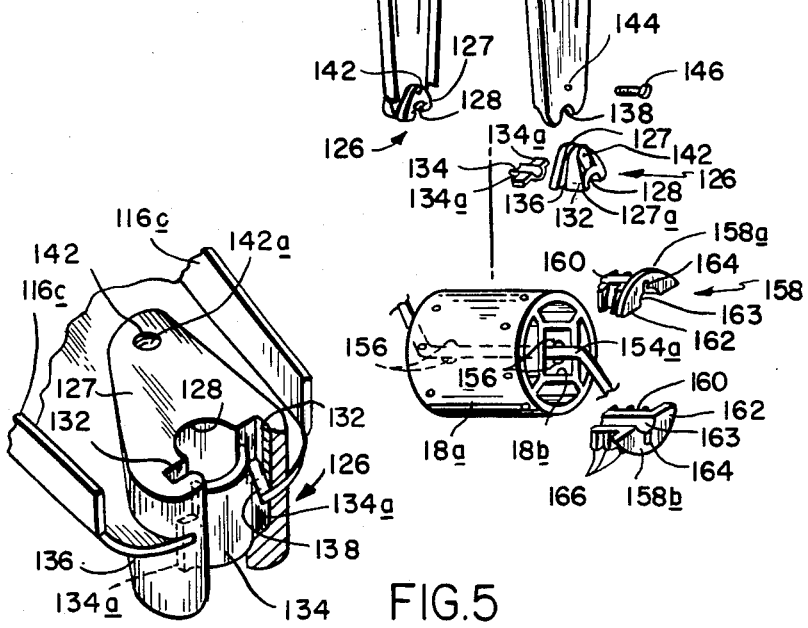
FIG. 4
FIG. 5

KNOCK-DOWN TRICYCLE

This invention concerns velocipedes. It relates particularly to children's tricycles which can be shipped and sold in a knock-down condition for subsequent assembly by the purchaser.

BACKGROUND OF THE INVENTION

Traditionally, tricycles have been made with frames composed of various tubes welded together to provide the requisite supports for the usual seats, wheels and handlebars. A typical trike includes a downwardly-rearwardly curved tubular backbone which supports a seat. The upper forward end of the backbone is butt-welded to a vertical head tube and the tricycle's front fork rotatively supporting the front wheel is journaled in the head tube so that the fork can pivot about its vertical axis. Handlebars attached to the fork extend up from the tube so that a child sitting on the seat can maneuver the tricycle by turning the handlebars in one direction or the other. The lower rear end of the backbone is welded to structure for supporting the tricycle's rear wheels. That supporting structure is usually either an inverted U-shaped tube whose ends connect to the opposite ends of an axle carrying the rear wheels or to a horizontal step plate, with the rear axle being secured to that plate. In both constructions, the rear wheels are rotatively mounted to the opposite ends of that axle so that the tricycle seat is positioned above the ground in a horizontal plane.

It is apparent that the construction of a tricycle in this fashion requires several separate welding operations. More particularly, all of the tubular members comprising the frame, which are steel sheets or plates to begin with, must be formed and seam-welded into tubes. Also, separate welding steps are required to connect the opposite ends of the backbone to the head tube and to the rear supporting structure. In some tricycles, additional welding is required to add reinforcement at certain locations on the frame, e.g., at the location of the seat.

Usually, when a prior tricycle leaves the plant, its frame exists as a welded-together unit consisting of a backbone, head tube, rear step plate and rear axle. The remaining components of the tricycle, namely the rear wheels, the seat, the front fork with its wheel and the handlebar unit, are disassembled from the frame so that all of the tricycle parts can fit in a relatively small carton for shipment to the various points of sale throughout the country. The cost of shipping and warehousing the packaged product is proportional to the size of the shipping carton or package. That, in turn, is directly dependent upon the envelope occupied by the tricycle frame in the shipping carton since the frame is, by far, the least compact item in the carton. That is, the frame is an irregular structure that has considerable extent in all three dimensions. Obviously, the size of the tricycle shipping package cannot be reduced materially without reducing the spatial envelope occupied by the parts comprising that frame.

There have been some attempts in the past to alleviate this problem by forming the bicycle frame in sections for subsequent assembly by the purchaser. However, these attempts have not resulted in very marketable products because either the various parts are too costly to manufacture or they are difficult to assemble without special tools. And, in some cases, the assembled tricycle is not as strong and sturdy as might be desired.

SUMMARY OF THE INVENTION

Accordingly, it is an object of the present invention to provide an improved knock-down tricycle.

Another object of the invention is to provide a tricycle of this type whose disassembled parts can be packaged in a relatively small carton or container.

A further object of the invention is to provide a knock-down tricycle whose packaged parts are relatively easy to assemble to form the finished play product.

Still another object of the invention is to provide a knock-down tricycle which, when assembled, constitutes an exceptionally strong and sturdy velocipede.

Another object of the invention is to provide a knock-down tricycle whose frame is composed substantially entirely of relatively inexpensive stamped metal parts.

Yet another object of the invention is to provide a knock-down tricycle which minimizes the number of assembly steps required at the point of manufacture.

Other objects will, in part, be obvious and will, in part, appear hereinafter.

The invention accordingly comprises the features of construction, combination of elements and arrangement of parts which will be exemplified in the following detailed description, and the scope of the invention will be indicated in the claims.

Briefly, the tricycle incorporating the invention has a frame that is completely devoid of the steel tubes that customarily comprise tricycle frames. Instead, the present trike has a backbone comprised of a pair of upwardly-forwardly extending, laterally spaced-apart, vertically oriented plates. The plates are held in spaced-apart relation by a head block connected between the upper ends of the plates and a seat bracket connected between the plates intermediate their ends and to which a seat is secured. The head block defines a vertical passage for journaling the upstanding post of a front fork assembly which rotatively supports the front wheel of the tricycle in a manner to be described later in detail. A handlebar unit is positioned above the head block with its stem extending down into and secured to the fork post so that the front fork and handlebar unit rotate together relative to the head block and frame.

The rear ends of the two backbone plates extend down to laterally spaced-apart locations on a horizontal rear step plate. However, instead of being welded or otherwise permanently secured to the step plate, the lower ends of the backbone plates are formed as tabs which are received in appropriately placed slots in the step plate. Each such tab includes a lateral job which, when the tab is received in the step plate, extends parallel to the underside of that plate and is bolted thereto. The end segment of the tab below or beyond the jog is parallel to the backbone plate from which it depends, i.e., it is vertical. When the two backbone plate tabs are thus bolted to the step plate, their vertical end segments are spaced parallel to one another between the opposite ends of the step plate.

Each such tab end segment has a lateral hole. The two holes are aligned and positioned under the step plate to slidably receive the rear axle such that the opposite ends of the axle project beyond the opposite ends of the step plate where they rotatively support the trike's rear wheels.

The spaced backbone plates connected to the head block at one end and to the rear step plate and rear axle at the other end with the seat bracket in between form a beam structure which is quite resistant to bending and racking. In fact, the frame structure of the present tricycle is as strong or stronger and more sturdy than the corresponding tubular welded frames of prior tricycles of this general type.

The construction of the tricycle frame as a beam or girder not only results in a velocipede which is stronger and safer in fact, but the tricycle also appears sturdier and more stable and rugged than prior comparable tricycles whose frames are composed essentially of relatively small-diameter welded-together tubes.

Also, since the frame of the present tricycle is composed mainly of bolted-together metal plates which, when disassembled, can be stacked flat in a small space, all of the components for making this tricycle can be packaged and shipped in a container which is considerably smaller than the containers required to package conventional knock-down tricycles. Yet the metal parts can be made relatively inexpensively in quantity by stamping and the only tools required to assemble them are conventional wrench and screwdriver tools. Accordingly, the present velocipede should prove to be a very marketable play item for children.

BRIEF DESCRIPTION OF THE DRAWINGS

For a fuller understanding of the nature and objects of the invention, reference should be had to the following detailed description, taken in connection with the accompanying drawings, in which:

FIG. 4 is an exploded isometric view on a larger scale showing certain components of the FIG. 1 tricycle in greater detail; and FIG. 5 is a fragmentary isometric view on an even larger scale showing the front wheel mounting bracket of the FIG. 1 tricycle in still greater detail.

DETAILED DESCRIPTION OF THE PREFERRED EMBODIMENT

Figure 1:
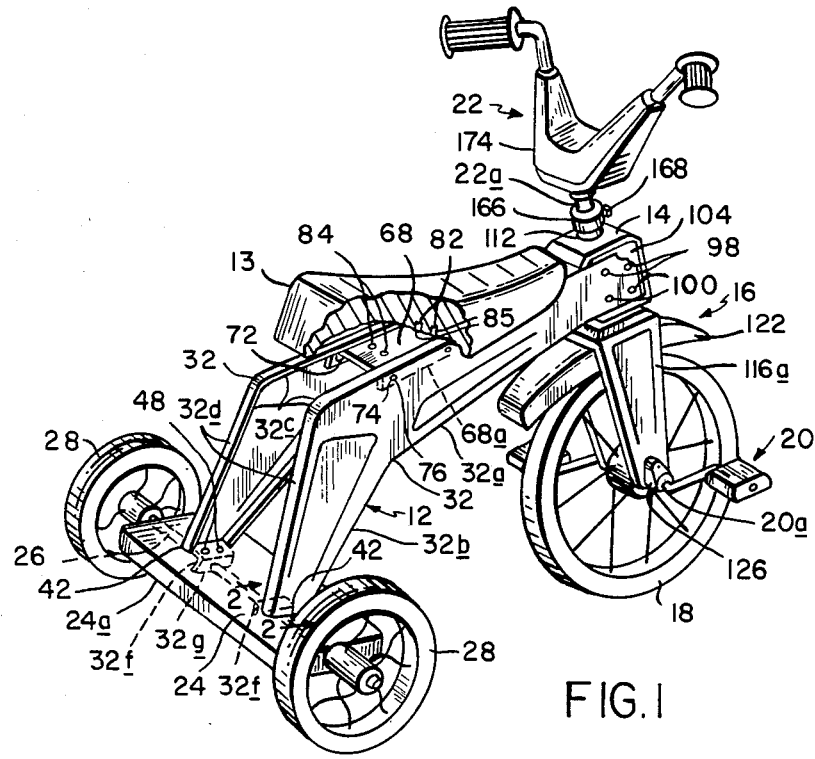
FIG. 1 is an isometric view with some parts broken away showing a knock-down tricycle embodying the features of this invention.

Referring to FIG. 1 of the drawings, my tricycle includes an upwardly forwardly-extending, rigid, beam-forming backbone assembly indicated generally at 12 which supports a horizontal riding seat 13. Connected to the forward end of assembly 12 is a head block 14 which supports a front fork assembly 16 for pivotal movement about a more or less vertical axis. The fork assembly 16 rotatively supports the tricycle's front wheel 18 which is fitted with the usual pedal crank 20 so that a child sitting on seat 13 can propel the tricycle with his feet by pushing on the pedal crank. The connection of the front wheel to the fork assembly will be described in greater detail in connection with FIG. 4. A handlebar unit 22 is connected to fork assembly 16 and extends up above the head block 14 in front of seat 13 so that the rider can steer the tricycle by turning the handlebar unit in one direction or the other.

The lower rear end of the backbone assembly 12 is connected between the ends of a horizontal rear step plate 24 provided with a depending flange or skirt 24a around its perimeter. The lower edge of that flange is rolled over on itself at 24b (FIG. 2) to provide a smooth edge there. The backbone assembly also supports a rear axle 26 which extends laterally of the backbone assembly underneath the step plate. The axle ends extend beyond the opposite ends of the step plate and rotatively support the tricycle's rear wheels 28. The connections between the backbone assembly and the rear step plate and axle will be described in more detail later in connection with FIGS. 2 and 3.

Figure 2:
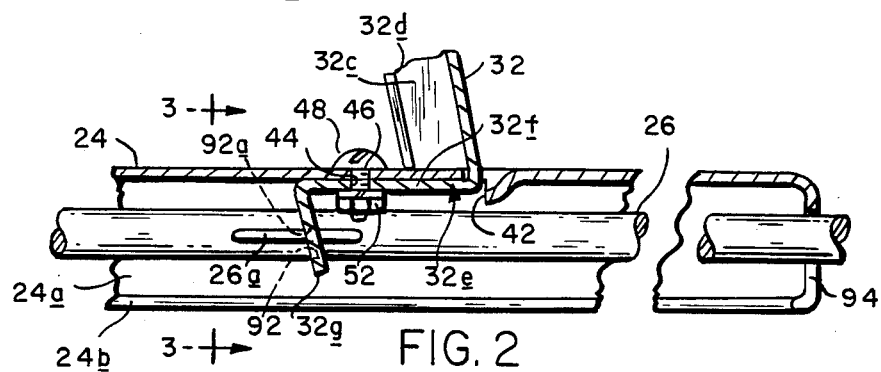
FIG. 2 is a sectional view along line 2—2 of FIG. 1.
Figure 3:
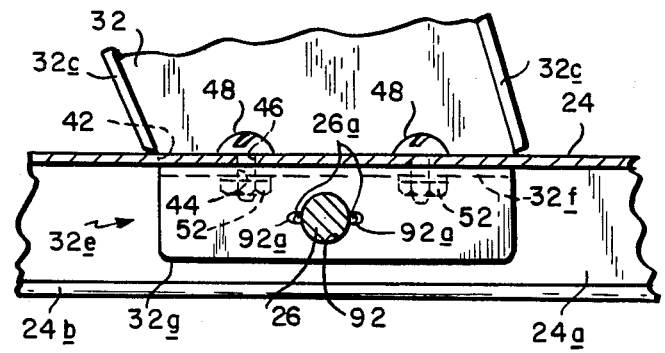
FIG. 3 is a sectional view along line 3—3 of FIG. 2.

Referring now to FIGS. 1 to 3, backbone assembly 12 comprises a pair of mirror-image stamped metal plates 32, 32. The right hand plate 32 includes a relatively long, generally horizontal forward leg 32a and a shorter, downwardly extending, tapered rear leg 32b. Edge margins of legs 32a and 32b are bent toward the other leg 32 to form aflange or skirt 32c which extends along the upper and lower edges of plate 32 between head 14 and step plate 24. The edges of those flanges are rolled over on themselves at 32d to provide finished edges on the plates.

An integral tab 32e terminates the rear end of the right-hand plate 32 below its flanges 32c. Tab 32e is bent twice just below the plate flanges 32c to form a lateral jog or step 32f and a vertical tab segment 32g which is parallel to the plate per se. Tab 32e is arranged and adapted to be received in a fore-and-aft slot 42 punched through the rear step plate 24. One edge of the slot 42 is depressed as shown in FIG. 2 so that by manipulating the plate 32 its tab 32e can be inserted through the slot prior to connecting the forward end of the plate to the head block 14. The tab seats in the slot so that the lower ends of the plate flanges 32c engage the top of the step plate with the tab jog 32f extending laterally just under the plate toward the left-hand plate 32 and with the tab end segment 32g extending down vertically below the plate inboard of the nominal plane of the plate as best seen in FIG. 2.

A pair of holes 44 are punched through the tab jog 32f which, when the tab is seated in the step plate, register with corresponding holes 46 punched through the step plate. A pair of bolts 48 extend downwardly through these holes and are anchored by nuts 52 threaded onto the bolts under the rear step plate, thereby securely anchoring the rear end of the right hand backbone plate 32 to the step plate.

The left-hand plate 32 comprising backbone 12 is connected in exactly the same way to the left wall of the head block 14 and to the rear step plate 24 via a second slot 42 spaced to the left of the first-mentioned slot so that the backbone 12 as a whole is centered between the opposite ends of the rear step plate. Preferably, the spacing between the two slots 42 in step plate 24 is appreciably greater than the width of the head block 14 so that the backbone 12 is wider at its rear end than at its forward end for better weight distribution and to increase the strength and stability of the tricycle as a whole. This being the case, the two slots 42 in plate 24 are toed in to accommodate the splayed plates 32.

After the two backbone plates 32 are attached to the rear step plate 24 as just described, a generally rectangular seat bracket 68 having depending side flanges 68a are positioned between the backbone plate legs 32a just under their upper flanges 32c as shown in FIG. 1. Bracket flanges 68a are provided with holes 72 which register with corresponding holes 74 punched in the plate legs 32a. The bracket 68 is tapered or wedge-shaped to correspond to the splay angle of plates 32 and it is anchored to the plate by nut and bolt fasteners 76 extending through those registering holes. The seat 13 is, in turn, anchored to bracket 68 by threaded fasteners 82 which extend upward through holes 84 in bracket 68 and are turned down into threaded passages 85 in the underside of seat 13.

Turning to FIGS. 2 and 3, the tabs 32e at the lower ends of the backbone plates 32 also provide anchoring points for the tricycle's rear axle 26. More particularly, lateral holes 92 sized to snugly receive axle 26 are punched through the tab end segments 32g. The holes 92 in the two tabs are aligned so that, when the axle is received in those holes, it extends directly below the longitudinal centerline of the rear step plate 24. The opposite ends of the axle project through vertical clearance slots 94 in the flange 24a at the opposite ends of the plate 24 far enough to accept the rear wheels 28.

As best seen in FIG. 3, the holes 92 in tab segments 32g are formed with diametrically opposite edge notches 92a and the two segments of axle 26 adjacent those holes are struck to form diametrically opposite raised ridges 26a which key into notches 92a when the axis is properly positioned under the step plate 24. This interfitting engagement between the axle and the tab opening edges prevents rotational movement of axle 26 relative to the tricycle frame. Longitudinal movement of the axle is inhibited by bending each tab segment 32g laterally toward or away from the other tab segment so that it makes a slight angle with the vertical direction as shown in FIG. 2. Resultantly, when the axle 26 is received in both holes 92, there is appreciable frictional engagement between the axle and the edges of those openings. That, together with wheels 28 secured to the axle just beyond the opposite ends of step plate 24, insure that there is no longitudinal motion of the axle relative to the tricycle frame.

Referring now to FIGS. 1 and 4, the forward ends of backbone plates 32 are connected to the opposite side walls of head block 14. For this, those walls are recessed and provided with upper and lower horizontal slots 97 for receiving the plate flanges 32c. This flange-slot engagement helps to preserve the relative positions of the plates and block. The plate ends have holes 98 for receiving threaded fasteners 100 which are turned down into threaded holes 102 in the opposite side walls of block 14. Plastic or metal cover plates 104 may be adhered or otherwise secured over the plate ends to conceal the fasteners 100 and give the head block a finished appearance.

Head block 14 is a strong lightweight honeycombed structural part preferably molded of an impact-resistant plastic material such as high density polyethylene or ABS plastic. It is formed with a vertical passage 110 which extends all the way down through the block to accept the upwardly extending tubular post 112 of the fork assembly 16. The lower end of passage 110 is counterbored at 110a to seat a circular bearing unit 114 engaged about post 112 so that the fork assembly pivots freely within the block. A similar bearing unit (not shown) may be provided at the upper end of passage 110 if desired, in which case, the upper end of passage 110 is also counterbored.

The fork assembly 16 also includes a stamped sheet metal strap 116 which is bent to the shape of an inverted letter U to form the vertical legs 116a of the fork assembly. A horizontal bridging portion 116b at the top of that strap has a hole 118 for slidably receiving the fork post 112. A flange 112a welded to the lower end of post 112 engages under the strap bridging portion 116b and is connected to that portion by welding or by threaded fasteners or other suitable means so that the post and strap form a single rigid assembly. The illustrated strap 116 is stamped so that its bridging portion 116b is more or less square in shape, while its legs are generally trapezoidal. The strap also has an edge flange 116c that extends all around the strap except at the lower ends of legs 116. In addition, the faces of the legs are dished so that the strap constitutes a beam which makes the fork assembly quite rigid and resistant to bending or racking. Although not necessary, the illustrated fork assembly 16 also includes an arcuate front fender 122 which is connected to strap portion 116b between legs 116a. This connection is made conveniently by sheet metal screws 123 extending down through holes in strap portion 116b in front of and behind post 112 and threaded into registering holes in the fender.

As shown in FIGS. 1 and 4, the front wheel 18 of the tricycle is rotatively mounted to the lower ends of the fork legs 116a by way of its pedal crank 20 as is commonly done in velocipedes of this general type. However, instead of being connected directly to the fork legs, the collinear pedal crank segmenst contiguous opposite sides of the wheel 18 that constitute the wheel axle 20a are journaled in a pair of identical brackets indicated generally at 126 which are, in turn, mounted to the lower ends of the strap legs 116a.

Referring now to FIGS. 4 and 5, each bracket 126 comprises a rigid, generally triangular block 127 molded of metal or a suitable strong plastic material such as high density polyethylene or ABS plastic. A passage 128 for wheel axle 20a extends laterally through block 127 with the passage axis lying on the vertical centerline of the block. To facilitate molding the block using relatively simple and inexpensive dies, passage 128 is not a complete cylinder. Rather, it is a generally semicylindrical vertical slot that is open at the bottom of the block.

Also, each block 127 has a lateral keyway 132 that intercepts passage 128. The keyway extends from the inner wall of block 127 facing the other bracket 126 almost to the opposite or outer wall of the block. Slidably received in that keyway is a semicylindrical metal or plastic retainer 134. A pair of laterally extending ears or tabs 134a are present at the upper edges of the retainer 134 at the outer ends thereof. These retainer tabs are slid into the mouth of keyway 132 at the inner wall of the block so that the block passage 128 and the retainer 134 together define a generally cylindrical journal for rotatively supporting the wheel axle 20a.

Block 127 has a relatively deep continuous peripheral groove or slot 136 which extends into the sloped side walls and top wall of the block and the lower ends of which intercept keyway 132. When the retainer 134 is received in the keyway, its tabs 134a extend out beyond the slot 136 bottom wall or floor and they are located in the keyway outboard of the slot, i.e. below the slot, as seen in FIG. 5.

With the block and retainer assembled thusly, the block 127 is engaged to the lower end of a strap leg 116a. More particularly, a relatively large vertical notch 138 is cut in the unflanged lower end of each leg 116a. The notch 138 is shaped and dimensioned such that its edges are received in the block slot 136 when the bracket 126 is slid upwards onto the leg end. When the bracket is properly positioned on the leg 116a, the opposite edges of the leg notch 138 are located just inboard of the retainer tabs 134a, i.e. above them, as seen in FIG. 5. Furthermore, those tabs extend out beyond those notch edges so that the tabs and the retainer 134 as a whole are captured at the outer end of the block keyway 132, i.e. the lower end in FIG. 5.

Each block 127 also has a screw hole 142 which extends laterally through the block above its passage 128, with the segment 142a of hole 142 inboard of the bracket slot 136 being threaded. When the bracket 126 is engaged to the end of plate leg 116a as just described, hole 142 registers with a screw hole 144 in that leg. A threaded fastener 146 is inserted through those holes and turned down into the threaded hole segment 142a of the block to anchor the bracket 126 to the end of leg 116a.

Thus, to assemble the wheel 18 and pedal crank 20 to the fork assembly 16, the two blocks 127 are engaged over the axle 20a on opposite sides of wheel 18, with the crank axle segments being received in block passages 128. Then, the retainers 134 are slid laterally into the block keyways 132 until their tabs 134a are located outboard of the corresponding block slots 136. Next, the two blocks 127 are slid onto the lower ends of the strap legs 116a with the wheel 18 fitting between the two legs until the block holes 142 register with the corresponding screw holes 144 in the strap legs. Finally, the threaded fasteners 146 are inserted into those screw holes and tightened down into their respective bracket blocks to complete the assembly.

Although the wheel 18 and pedal crank 20 can be a conventional assembly wherein the portions of the pedal crank on opposite sides of the wheel are welded to the wheel hub, the wheel 18 in the illustrated tricycle is a molded plastic wheel and the metal pedal crank 20 is itself separable from wheel 18 as shown in FIG. 4. Accordingly, the wheel and pedal crank, which would otherwise occupy a fairly large, three-dimensional envelope, can be disassembled so that its components can all lie flat in a small volume package or shipping carton.

As shown in FIG. 4, crank 20 is a single stepped rod 154 having two pairs of diametrically opposite lateral tabs 156 formed on the intermediate rod segment 154a spaced at opposite sides of that segment's vertical centerline. The segment 154a of the crank rod comprises the wheel axle 20a referred to above that is journaled in brackets 126. Wheel 18 has a hub 18a formed with an axial passage 18b having a rectangular cross section. Passage 18b is sufficiently large that rod 154 can be inserted into and centered in passage 18b by the customer as shown in FIG. 4 even though the rod ends are bent to form the pedal crank. The rod is held in position in the hub 18a by two split bushings 158 that engage around the rod segment 154a and are inserted into the opposite ends of hub passage 18b.

Each bushing is composed of two identical sections 158a and 158b. Each such section has a generally rectangular body 160 with a semicircular flange 162 at its outer end. A semicircular groove 163 extends the entire length of the section wall adjacent the flat edge of the flange 162. Also, a lengthwise slot 164 is present at the bottom of that groove. The two sections 158a and 158b of each bushing 158 are shaped and dimensioned so that they can be engaged to opposite sides of the crank rod segment 154a with their grooves 163 forming a cylindrical passage to accommodate that segment. When the rod segment is clamped thusly between the two bushing sections, one pair of its tabs 156 engage in the bushing section slots 164 to rotatively lock the crank rod to that bushing 158. The bushing is then inserted into the corresponding end of the wheel hub passage 18b. Protruding ribs 166 are formed on the sides of the two section bodies 160 which tightly engage the opposite walls of passages 18b to retain that bushing 158 in the hub passage.

Still referring to FIG. 4, after the wheel 18 and pedal crank 20 are connected to the fork assembly 16, that assembly is mounted to the head block 14 by inserting the fork post 112 up through the passage 110 in the block and mounting the handlebar unit 22 to post 112 to capture the block between the handlebar unit and the fork assembly. For this, the handlebar unit has a depending stem 22a that is inserted down into the tubular fork post 112 accessible in block passage 112. The stem 22a carries an annular collar 166. That collar is oriented so that a set screw 168 threaded into the side of the collar registers with a vertically elongated hole 172 present adjacent the upper end of the fork post 112. When the handlebar unit 22 is rotationally aligned with the fork assembly 16, collar 166 is engaged over the upper end of post 112 projecting above block 14 and its set screw 168 is tightened so that the inner end of the screw extends through post hole 172 and bites into stem 22a of the handlebar unit thereby locking the handlebar unit 22 to the fork assembly 16 both rotationally and axially.

As an additional design feature enhancing the marketability of the present tricycle, the handlebar unit 22 is provided with a decorative cover 174 best seen in FIGS. 1 and 4. This cover comprises a pair of upper and lower molded plastic clamshell sections 174a and 174b which engage the handlebars from above and below. The lower section 174b is formed with a central vertical opening 176 which receives the handlebar unit stem 22a prior for placing collar 166 on the stem. The two cover sections 174a, 174b are clamped together above and below the handlebars by threaded fasteners 178 extending up through appropriate openings 180 in the lower section 174b and turned down into threaded passages 182 formed in the upper section 174a.

It will be seen from the foregoing, then, that many of the major structural components of the present tricycle are stamped metal or molded plastic parts which can be manufactured quite inexpensively in quantity. These parts, when disassembled, occupy a relatively small amount of space. Therefore, the components of the tricycle can be shipped and stored in a package or envelope of minimum volume. Furthermore, the parts comprising the tricycle can be assembled quite easily by the average person using a few simple tools. When assembled, the tricycle constitutes a very safe and sturdy plaything for a child.

It will thus be seen that the objects set forth above, among those made apparent from the preceding description, are efficiently attained, and, since certain changes may be made in the above construction without departing from the scope of the invention, it is intended that all matter contained in the above description or shown in the accompanying drawings be interpreted as illustrative and not in a limiting sense.

It is also to be understood that the following claims are intended to cover all of the generic and specific features of the invention herein described.

What is claimed as new and desired to be secured by Letters Patent of the United States is:

1. In a tricycle of the type having a backbone with a longitudinal axis, a front fork and handlebar assembly pivotally mounted to the front end of the backbone, a rear axle mounted to the rear end of the backbone lying generally perpendicular to said longitudinal axis thereof, the improvement wherein the backbone comprises A. a pair of spaced-apart parallel plates, each having an upper front end and a lower rear end;
B. a head block positioned between said plates at the front ends thereof, said block including means for journaling said front fork and handlebar assembly;
C. means for connecting the plate front ends to said block;
D. a rear step plate;
E. means for connecting each said plate rear end to said step plate, said connecting means including
  1. a slot in the rear step plate,
  2. a tab extending from the rear end of said plate through said step plate slot, said tab including a lateral jog which extends flush against the underside of said rear step plate; and
  3. one or more fasteners connected between said tab jog and said step plate; and
F. seating means connected between said plates the ends thereof, said plates, head block and seating means forming a rigid beam structure for supporting a rider.

2. The tricycle defined in claim 1 wherein said backbone plates are spaced further apart at their said rear ends than at their said front ends.

3. The tricycle defined in claim 1 wherein each backbone plate has upper and lower edge margins oriented approximately 90° with respect to the longitudinal plane of said plate.

4. The tricycle defined in claim 1 wherein the seating means include
A. a bracket connected between said backbone plates adjacent upper edges thereof;
B. a seat positioned on said backbone plates; and
C. fastener means connected between said bracket and said seat.

5. The tricycle defined in claim 1 wherein said head block comprises a molded plastic honeycomb structure.

6. The tricycle defined in claim 1 wherein
A. each said tab includes
  (1) an end portion beyond its jog which extends appreciably below the rear step plate, said tab end portion lying in a plane that is substantially parallel to the plate from which it extends, and
  (2) means defining an axle-receiving opening in each tab end portion, the openings in the two tab end portions being more or less collinear; and
B. said rear axle is received in said openings so that the axle is retained by said tabs.

7. The tricycle defined in claim 6 and further including interfitting means on said rear axle and each said tab end portion for preventing rotation of said axle about the axle axis.

8. The tricycle defined in claim 6 wherein each said tab end portion is bent so that it frictionally engages said rear axle thereby preventing rotational and longitudinal movements of said axle relative to said tab.

9. The tricycle defined in claim 1 wherein the front fork of said front fork and handlebar assembly includes
A. a plate bent to the shape of an inverted letter U so as to form a pair of spaced-apart parallel front fork legs connected by a bridging portion at the upper ends of the legs;
B. an upstanding tubular fork post;
C. means for connecting the lower end of the fork post to said bridging portion, said fork post being arranged to be rotatively received in said head block journaling means; and
D. means for rotatively fixing the handlebar of said front fork and handlebar assembly to the upper end of said fork post.

10. The tricycle defined in claim 9 and further including
A. a front wheel having an axle whose ends project from opposite sides of the wheel; and
B. means for rotatively mounting said axle ends to the lower ends of said front fork legs with said wheel located between said legs, each said mounting means including
  (1) a wheel bracket having a semi-cylindrical passage therein,
  (2) a retainer having a semi-cylindrical wall portion,
  (3) means for keying said retainer to said wheel bracket so that said bracket and said retainer can be engaged about an end of said axle and keyed together to form a journal for said axle end, and
  (4) means for releasably connecting said bracket to the lower end of a said front fork plate leg.

11. The tricycle defined in claim 10 and further including means on each of said retainers and the end of the corresponding front fork leg which interfit when the corresponding wheel bracket is mounted to said leg so as to lock said retainer to the corresponding wheel bracket.

12. In a tricycle of the type having a backbone with a longitudinal axis, a front fork and handlebar assembly pivotally mounted to the front end of the backbone, a rear axle mounted to the rear end of the backbone and oriented generally perpendicular to said longitudinal axis thereof, the improvement wherein the backbone comprises
A. a pair of spaced-apart parallel plates;
B. a head block positioned between said plates at the front ends thereof, said block including means for journaling said front fork and handlebar assembly;
C. means for connecting the plate front ends to said block;
D. a front wheel having a hub;
E. means defining an axial passage in the hub which has a noncircular cross section;
F. a pedal crank rod removably received in said passage, said rod having a straight segment intermediate its ends which is centered in said passage;
G. split bushing means clamped to said rod segment from opposite sides and wedged into the opposite ends of said hub passage to maintain the longitudinal centerline of said rod segment on the axis of said hub;
H. coacting means on said bushing means and said rod segment for preventing relative rotation of said bushing means and said rod; and
I. means for rotatively mounting said rod segment to said front fork and handlebar assembly;
J. a rear step plate;
K. means connecting each said plate rear end to said step plate, said connecting means including
  1. a slot in the rear step plate,
  2. a tab extending from the rear end of said plate through said step plate slot, said tab including a lateral jog which extends flush against the underside of said rear step plate;
  3. one or more fasteners connected between said tab jog and said step plate; and L. seating means connected between said plates intermediate the ends thereof, said plates, head block and seating means forming a rigid beam structure for supporting a rider.

13. A knock-down velocipede comprising
    A. a pair of similar elongated flanged plate members having front and rear ends;
    B. seating means;
    C. means for connecting said seating means to said plate members intermediate the ends thereof so as to maintain said plate members in spaced-apart relation to form a backbone having a longitudinal axis;
    D. a head block connected to the front ends of said plate members;
    E. a front fork and handlebar assembly journaled in said head block;
    F. a step plate connected to the rear ends of said plate members, said plate members, seating means, head block and step plate forming a rigid beam structure capable of supporting a rider on said seating means;
    G. a rear axle extending under said step plate in a direction generally perpendicular to the longitudinal axis of said backbone; and
    H. means for mounting said rear axle to the rear ends of said plate members at the underside of said step plate, said mounting means including
        1. a tab extending from the rear end of each of the two plate members through said step plate, and
        2. collinear openings in said two tabs for snugly receiving said axle at spaced-apart locations along said axle.

14. The velocipede defined in claim 13 wherein said tabs are bent relative to the longitudinal axis of said axle so that the edges of their openings frictionally engage said axle to inhibit rotational and longitudinal movements of said axle relative to said tabs.

15. The velocipede defined in claim 13 and further including interfitting means on said axle and each of said tabs to prevent rotational movements of said axle relative to said tabs.

16. The velocipede defined in claim 13 wherein
    A. each said tab includes a lateral jog which extends flush against the underside of said step plate; and
    B. fastener means secure each said jog to said step plate to connect the assembled backbone plate to said step plate.

17. A knock-down velocipede comprising
    A. a pair of similar elongated flanged plate members having front and rear ends;
    B. seating means;
    C. means for connecting said seating means to said plate members intermediate the ends thereof so as to maintain said plate members in spaced-apart relation to form a backbone having a longitudinal axis;
    D. a head block connected to the front ends of said plate members;
    E. a front fork and handlebar assembly journaled in said head block;
    F. a front wheel having a hub;
    G. means defining an axial passage in the hub which has a noncircular cross section;
    H. a pedal crank rod removably received in said passage, said rod having a straight segment intermediate its ends which is centered in said passage;
    I. split bushing means clamped to said rod segment from opposite sides and wedged into the opposite ends of said hub passage to maintain the longitudinal centerline of said rod segment on the axis of said hub;
    J. coating means on said bushing means and said rod segment for preventing relative rotation of said bushing means and said rod;
    K. means for rotatively mounting said rod segment to said front fork and handlebar assembly;
    L. a step plate connected to the rear ends of said plate members, said plate members, seating means, head block and step plate forming a rigid beam structure capable of supporting a rider on said seating means;
    M. a rear axle extending under said step plate in a direction generally perpendicular to the longitudinal axis of said backbone; and
    N. means for mounting said rear axle to the rear ends of said plate members at the underside of said step plate.

18. The velocipede defined in claim 17 wherein the front fork of said front fork and handlebar assembly comprises
    A. a plate bent in the form of an inverted letter U to have a pair of spaced-apart parallel fork legs and a bridge at the upper ends of said legs;
    B. a fork post journalled in said head block;
    C. means for connecting the lower end of the fork post to said bridge; and
    D. wherein said rod segment is rotatively mounted to the lower ends of said fork legs.

19. The velocipede defined in claim 18 wherein said front fork further includes
    A. a front fender located at the underside of said plate bridge; and
    B. means for securing said fender to said plate bridge.

20. A knock-down velocipede comprising
    A. a backbone having a front end and a rear end and a longitudinal axis;
    B. a head block connected to the front end of said backbone;
    C. a seat mounted to said backbone intermediate the ends thereof;
    D. a rear axle supporting the rear end of said backbone; and
    E. a front fork and handlebar assembly journaled in said head block, the front fork of said assembly comprising
        (1) a plate bent in the form of an inverter letter U to have a pair of spaced-apart parallel fork legs and a bridge at the upper ends of said legs,
        (2) a fork post journaled in said head block,
        (3) means for connecting the lower end of the fork post to said bridge,
        (4) a wheel including an axle whose ends project from opposite sides of the wheel, and
        (5) means for rotatively fixing said axle ends to the lower ends of said fork legs, said fixing means including
            (a) a bracket defining a semi-cylindrical passage;
            (b) a retainer having a semi-cylindrical wall portion;
            (c) means for slidably connecting said retainer to said bracket so that the retainer wall portion and said bracket passage together define a cylindrical journal for rotatively receiving the corresponding end of said axle; and
            (d) means for securing each bracket to the lower end of its corresponding fork leg.

21. The velocipede defined in claim 20 and further including interfitting means on each fork leg lower end and its corresponding retainer for locking said retainer to its corresponding bracket when said bracket is secured to its corresponding fork leg end.

22. The velocipede defined in claim 20 wherein each said securing means include
   A. means for keying a said bracket to its corresponding fork leg end; and
   B. means for fastening said bracket to said fork leg.

23. A knock-down velocipede comprising
   A. a backbone having a front end and a rear end and a longitudinal axis;
   B. a head block connected to the front end of said backbone;
   C. a seat mounted to said backbone intermediate the ends thereof;
   D. a rear axle supporting the rear end of said backbone,
   E. a front fork and handlebar assembly journaled in said head block, the front fork of said assembly comprising
      (1) a plate bent in the form of an inverted letter U to have a pair of spaced-apart parallel fork legs and a bridge at the upper ends of said legs,
      (2) a fork post journaled in said head block, and
      (3) means for connecting the lower end of the fork post to said bridge;
   F. a wheel, said wheel including
      (1) a hub,
      (2) means defining an axial passage in the hub which has a noncircular cross section;
      (3) a pedal crank rod removably received in said passage, said rod having a straight segment intermediate its ends which is centered in said passage forming a front axle that projects from opposite sides of the wheel,
      (4) split bushing means clamped to said rod segment from opposite sides and wedged into the opposite ends of said hub passage to maintain the longitudinal centerline of said rod segment on the axis of said hub, and
      (5) coacting means on said bushing means and, said rod segment for preventing relative rotation of said bushing means and said rod; and
   I. means for rotatively fixing said crank rod straight segment to the lower ends of said fork legs.

* * * * *